United States Patent [19]

McDonald

[11] 4,149,689
[45] Apr. 17, 1979

[54] PROTECTIVE SCREEN FOR JET-ENGINE INTAKE

[76] Inventor: John McDonald, 57 Auburn Ave., Staten Island, N.Y. 10314

[21] Appl. No.: 812,433

[22] Filed: Jul. 1, 1977

Related U.S. Application Data

[63] Continuation-in-part of Ser. No. 715,459, Aug. 18, 1976, abandoned.

[51] Int. Cl.² .............................................. B64D 33/02
[52] U.S. Cl. .................................... 244/53 B; 55/306; 60/39.09 D; 60/39.09 P; 244/134 C; 416/247 R
[58] Field of Search ............ 244/53 B, 134 B, 134 C; 55/306; 60/39.09 P, 39.09 D; 160/180; 416/247 R; 415/121 G

[56] References Cited

U.S. PATENT DOCUMENTS

| | | | |
|---|---|---|---|
| 1,757,896 | 5/1930 | Baron | 160/180 X |
| 2,474,068 | 6/1949 | Sammons et al. | 60/39.09 P |
| 2,634,049 | 4/1953 | Hodges et al. | 244/134 C X |
| 3,121,545 | 2/1964 | Meletiou | 244/53 B |
| 3,196,598 | 7/1965 | Olson | 60/39.09 P |
| 3,288,200 | 11/1966 | Gagne | 160/180 |
| 3,871,844 | 3/1975 | Calvin | 244/53 B X |

OTHER PUBLICATIONS

*Flight*, vol. 62, Dec. 5, 1952, p. 694 (Photo of guard on Saab's J-29 Ghost).

*Primary Examiner*—Barry L. Kelmachter

[57] ABSTRACT

The forwardly open intake end of a jet engine, powering an aircraft, is screened against birds and other airborne objects by a conical cage formed from an array of metal rods converging on the engine axis, the rods being held together at the vertex of the cone by a solid tip and in an intermediate plane as well as at the cone base by a pair of metal rings. In flight, they are free to vibrate so as to shake off adhering ice particles. De-icing can be further promoted by feeding back exhaust gases from the rear of the engine to the interior of the cage through an external pipe.

7 Claims, 3 Drawing Figures

PROTECTIVE SCREEN FOR JET-ENGINE INTAKE

CROSS-REFERENCE TO RELATED APPLICATION

This is a continuation-in-part of my copending application Ser. No. 715,459, filed Aug. 18, 1976 and now abandoned.

FIELD OF THE INVENTION

My present invention relates to a protective screen for the air intake of a jet engine mounted in a nacelle of an aircraft.

BACKGROUND OF THE INVENTION

Flying objects, including birds, have frequently been the cause of malfunction of the power plants of jet aircraft by being drawn into the intake ends of their engines. To prevent such malfunctions and possible accidents resulting therefrom, the use of protective devices for the intake ends of such jet engines has already been proposed. Known devices of this type generally are in the form of curved screens with relatively small meshes formed by intersecting wires. The transverse wire loops of these screens form a rather tight array when projected onto a plane perpendicular to the engine axis, thus presenting an elevated resistance to the in-flight aspiration of air by the engine. Also, the limited relative mobility of the wires and their rather close juxtaposition are conducive to the deposition of the ice particles on the screen surface, thus requiring special measures such as electric heating for de-icing.

OBJECTS OF THE INVENTION

The general object of my present invention, therefore, is to provide a protective screen for the purpose set forth which is structurally stable, has a low air resistance and minimizes the problem of ice formation.

An ancillary object is to provide simple de-icing means for a screen of this nature.

SUMMARY OF THE INVENTION

The protective screen according to my present invention comprises a frustoconical array of a multiplicity of straight resilient metal rods, e.g. of stainless steel, surrounding the front end of the nacelle to form a cage-like structure, the rods converging forwardly from that front end and having their forward ends held together by a pointed tip lying substantially in line with the nacelle axis.

In a preferred embodiment, the rods are further interconnected at not more than two other points, namely at the base of the conical cage structure by a mounting ring secured to the nacelle and at an intermediate location—about midway of their length—by a retaining ring. Thus, the rods are free to vibrate in flight over large portions of their length (or even over their full length if the retaining ring is omitted) so as to shake off ice particles which might adhere to them. Their vibrations, moreover, increase their effectiveness in fending off birds or debris without significantly impeding the access of air to the jet-engine intake, even with a relatively wide separation at their rear extremities. Their constant convergence angle, which is preferably not more than about 30° on either side of the nacelle axis, lets them easily deflect oncoming objects impinging anywhere upon the cage.

Pursuant to a further feature of my invention, a small fraction of the exhaust gases generated by the jet engine is fed back by one or more conduits—preferably a single external pipe—from the rear end of the nacelle to the interior of the screen to help with the de-icing of the rods.

BRIEF DESCRIPTION OF THE DRAWING

The above and other features of my invention will now be described in detail with reference to the accompanying drawing in which.

SPECIFIC DESCRIPTION

Figure 1:
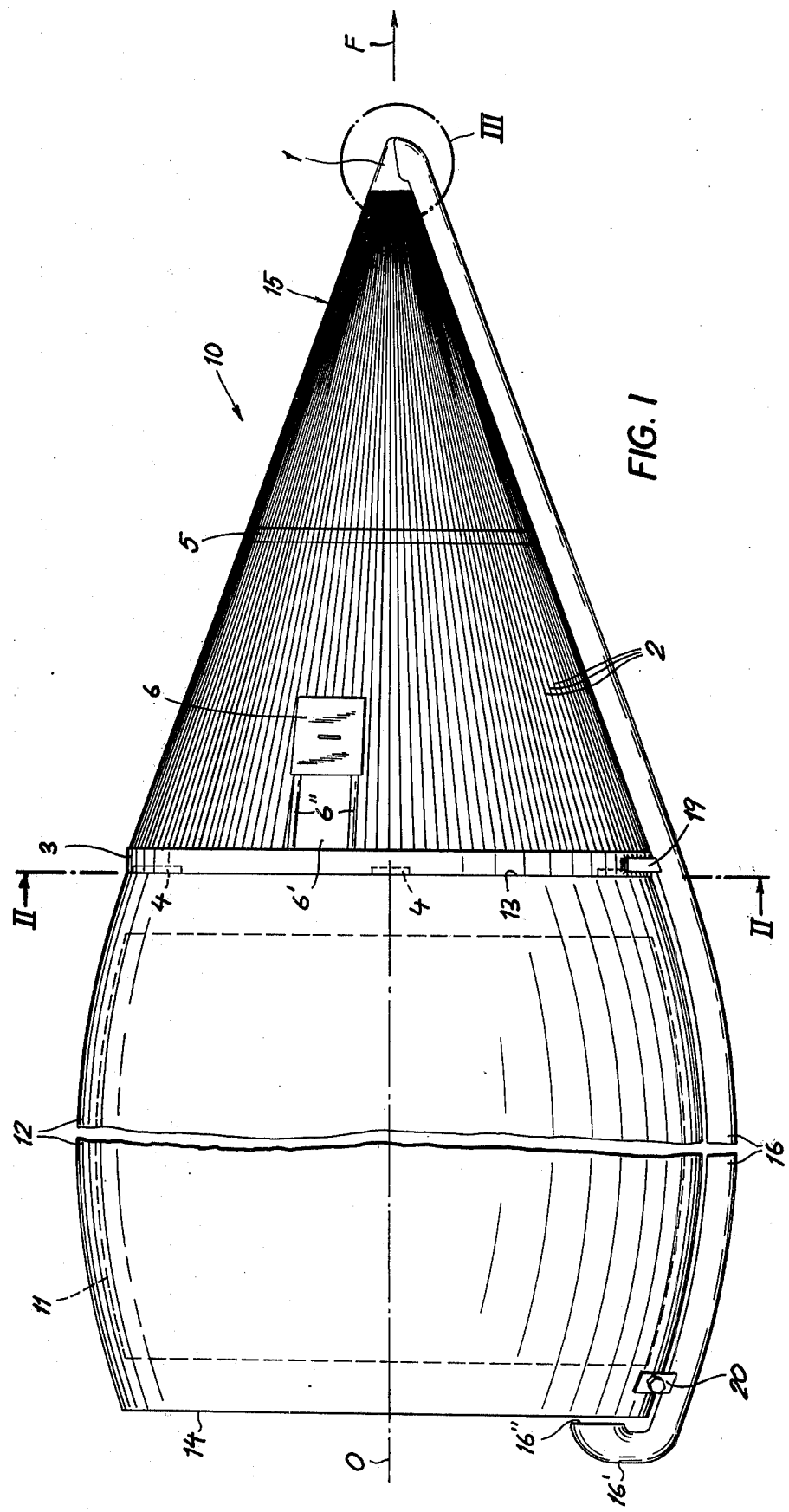
FIG. 1 is a side-elevational view of a jet-engine nacelle of an aircraft provided with a protective screen according to my invention.

In FIG. 1 I have shown a power plant 10 of an aircraft, not further illustrated, comprising a jet engine 11 in a nacelle 12 which may be mounted on a wing of the craft and is open at an intake end 13 and an exhaust end 14. The nacelle and its engine are centered on an axis O oriented in the direction of flight which has been indicated by an arrow F.

Figure 2:
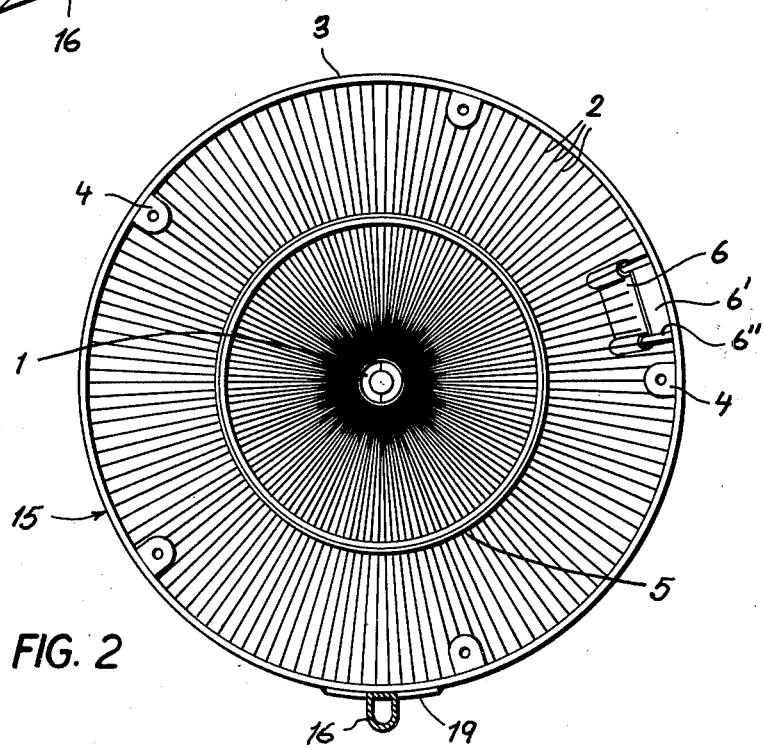
FIG. 2 is an end view of the screen taken on the line II—II of FIG. 1.

A protective screen 15 embodying my invention, also shown in FIG. 2, comprises a frustoconical array of straight, resilient and therefore vibratile metal rods 2 whose rear extremities are held together by a mounting ring 3 having inwardly projecting lugs 4 by which it is bolted to the intake end 13 of the nacelle 12. The forward ends of the rods 2 are fixedly secured, as by welding, to a pointed tip 1 also centered on axis O; the rods are shown to include with this axis an acute angle of less than 30°. A retaining ring 5 inside the cage-like screen 15 interconnects the rods 2 in a transverse plane about halfway between the base and the vertex of the cone, the rods being otherwise free to oscillate transversely at their natural frequency. Certain of these rods are foreshortened at their rear extremities to form a port 6' in the vicinity of the intake end 13, this port serving as an access opening allowing a mechanic to reach into the interior of the screen for tightening or loosening the nonillustrated mounting bolts which traverse the lugs 4. The port 6' is normally closed by a door 6 in the form of a sliding cover which is guided by a pair of parallel rails 6" on opposite sides of the opening. The door 6, provided with a handle, may be held in its closure position by a latch not shown.

Figure 3:
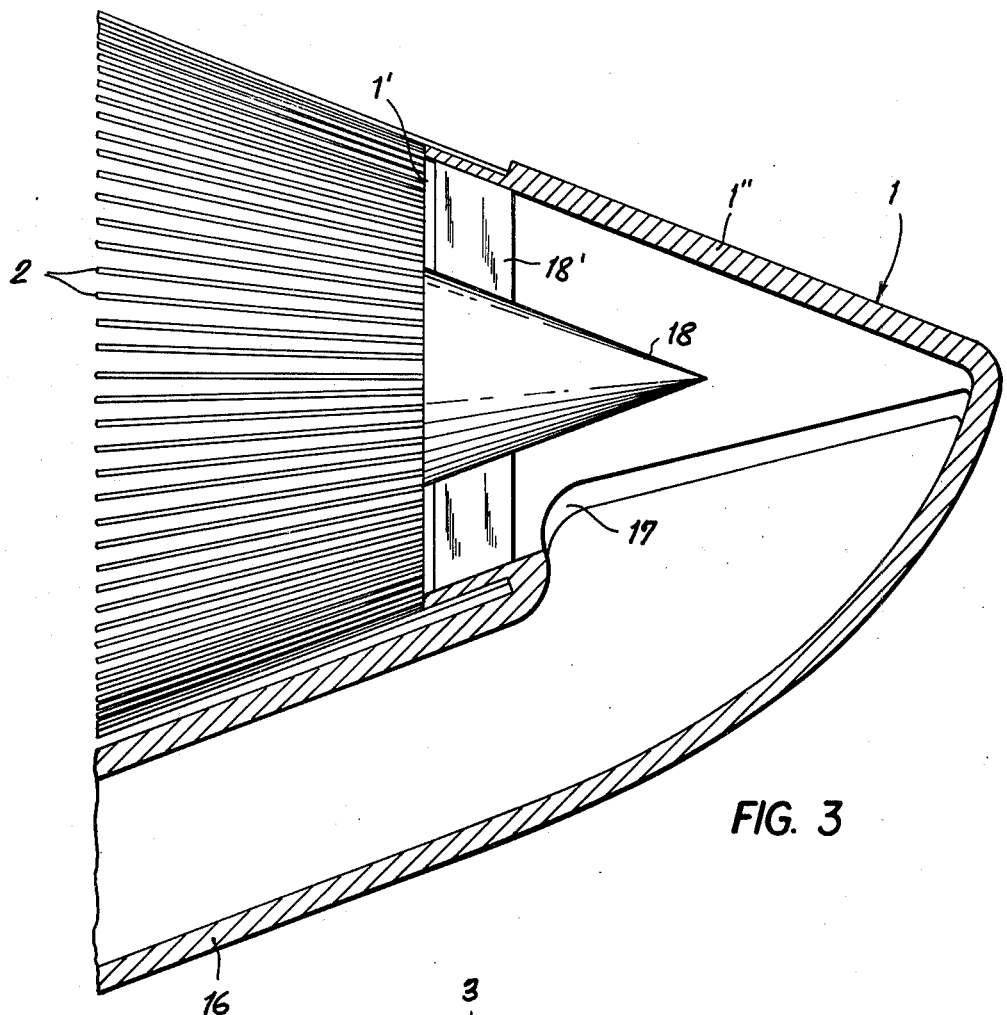
FIG. 3 is a longitudinal sectional view, drawn to a larger scale, of the forward end of the screen encompassed by a circle III in FIG. 1.

The tip 1 at the vertex of the conical structure is hollow, as best seen in FIG. 3, and forms a mouth 1' open toward the cage 15. Its conical peripheral wall 1" has an aperture 17 communicating with a pipe 16 which feeds back some of the exhaust gases, issuing from the rear end 14 of nacelle 12, to the interior of the cage. Pipe 16 extends along the exterior of the nacelle, advantageously at a sheltered location near the body of the aircraft, and is held in position by a strap 19 welded to mounting ring 3 and a further strap 20 bolted to the nacelle. A conical insert 18 within tip 1, supported by radial webs 18', directs the hot exhaust gases from pipe 16 to the inner rod surfaces for preventing the formation of ice thereon. These gases will thus be most effective in an area of the screen remote from the jet engine 11 where the risk of icing is greatest. The free end 16' of the pipe 16 is shown to have an inlet 16" slightly spaced from the discharge end 14 of the nacelle; this facilitates the mounting and demounting of the assembly 15, 16.

I claim:

1. In an aircraft having a jet engine mounted in a forwardly and rearwardly open nacelle with an axis oriented in the direction of flight, said jet engine having an air intake at the front end of said nacelle, the combination therewith of a protective screen for said air intake, said screen being essentially constituted by a frustoconical array of a multiplicity of closely spaced straight resilient metal rods surrounding the front end of said nacelle and converging forwardly therefrom, a pointed tip substantially in line with said axis for holding the forward ends of said rods together, said rods being mutually unconnected over a substantial part of their length to facilitate their vibration in flight, certain of said rods being foreshortened to provide an access opening in the vicinity of said front end, and door means on said screen normally closing said access opening.

2. The combination defined in claim 1 wherein said door means comprises a cover axially slidable along a pair of rails adjoining said access opening.

3. The combination defined in claim 1, further comprising conduit means extending from the rear end of said nacelle to the interior of said screen for feeding back exhaust gases to de-ice said rods.

4. The combination defined in claim 3 wherein said tip is hollow, said conduit means comprising a pipe on the outside of said nacelle terminating at said hollow tip and deflector means in said tip for directing said exhaust gases against inner surface portions of said rods.

5. The combination defined in claim 1 wherein said screen is provided with a retaining ring lying in a plane transverse to said axis and interconnecting said rods at a location generally midway of their length, said rods being mutually unconnected between said ring and said tip.

6. The combination defined in claim 5 wherein said screen is further provided with a mounting ring connected with said rods and secured to said nacelle, said rods being mutually unconnected between said rings with freedom to vibrate between said tip, said retaining ring and said mounting ring.

7. The combination defined in claim 1 wherein said rods include with said axis an angle not exceeding about 30°.

* * * * *